US008756587B2

(12) United States Patent
Pistoia et al.

(10) Patent No.: US 8,756,587 B2
(45) Date of Patent: *Jun. 17, 2014

(54) STATIC ANALYSIS OF COMPUTER SOFTWARE APPLICATIONS

(75) Inventors: Marco Pistoia, Hawthorne, NY (US); Omer Tripp, Herzelyia (IL)

(73) Assignee: International Business Machines Corporation, Armonk, NY (US)

(*) Notice: Subject to any disclaimer, the term of this patent is extended or adjusted under 35 U.S.C. 154(b) by 87 days.

This patent is subject to a terminal disclaimer.

(21) Appl. No.: 13/250,510

(22) Filed: Sep. 30, 2011

(65) Prior Publication Data

US 2013/0086561 A1    Apr. 4, 2013

(51) Int. Cl.
*G06F 9/44*    (2006.01)

(52) U.S. Cl.
USPC ........... 717/132; 717/128; 717/144; 717/152; 717/154; 717/155

(58) Field of Classification Search
USPC .......................................................... 717/132
See application file for complete search history.

(56) References Cited

U.S. PATENT DOCUMENTS

| 6,618,737 | B2 | 9/2003 | Aridor et al. | |
| 7,237,236 | B2* | 6/2007 | Kershenbaum et al. | 717/154 |
| 2002/0091995 | A1* | 7/2002 | Arnold et al. | 717/124 |
| 2009/0150857 | A1* | 6/2009 | Srinivasan et al. | 717/104 |
| 2010/0180255 | A1* | 7/2010 | Chung et al. | 717/110 |

OTHER PUBLICATIONS

Aridor et al., "Transparently Obtaining Scalability for Java Applications on a Cluster", Journal of Parallel and Distributed Computing—Special Issue on Java on Clusters. vol. 60 Issue 10, Oct. 2000, Publisher: Academic Press, Inc. Orlando, FL, USA. ISSN: 0743-7315.
Whaley et al., "Cloning-Based Context-Sensitive Pointer Alias Analysis Using Binary Decision Diagrams", PLDI'04, Jun. 9-11, 2004, Washington, DC, USA. Copyright 2004 ACM.
Seng et al., "Search-Based Determination of Refactorings for Improving the Class Structure of Object-Oriented Systems", GECCO'06, Jul. 8-12, 2006, Seattle, Washington, USA. Copyright 2006 ACM.

* cited by examiner

*Primary Examiner* — Don Wong
*Assistant Examiner* — Roberto E Luna
(74) *Attorney, Agent, or Firm* — Patents on Demand P.A.; Brian K. Buchheit; Scott M. Garrett

(57) ABSTRACT

Static analysis of a computer software application can be performed by applying a first level of abstraction to model a plurality of run-time objects, thereby producing a set of object abstractions. Static data-flow analysis of the computer software application can be performed using the set of object abstractions, thereby producing a first data-flow propagation graph. A data-flow bottleneck can be identified within the data-flow propagation graph. A second level of abstraction can be applied to model any of the run-time objects having in the set of object abstractions a corresponding object abstraction that is traceable to the data-flow bottleneck. The applying the second level of abstraction can decompose the corresponding object abstraction into a set of object abstractions, thereby modifying the set of object abstractions. Static data-flow analysis of the computer software application can be performed using the modified set of object abstractions.

18 Claims, 4 Drawing Sheets

```
class zoo { void foo() {
        HttpServletRequest req;
        ...
        String userNameStr = req.getParameter("userName"); // untrusted input
        UserProfile profile = UserProfiles.makeProfile(str); // call to factory
method
        } void bar() {
        ...
        String adminStr = "admin";
        UserProfile profile = UserProfiles.makeProfile(admin); // call to factory
method
        DB.update(profile.getId()); // security-sensitive op
        ...
        }
} class UserProfile {
        UserProfile(String userName) {
                this.userId = userName;
        } public String getId() {
                return userId;
        }
} class UserProfiles {
        public static UserProfile makeProfile(String userId) {
                return new UserProfile(userId);
        }
        ...
}
```

Fig. 3

US 8,756,587 B2

STATIC ANALYSIS OF COMPUTER SOFTWARE APPLICATIONS

BACKGROUND

The present invention relates to computer software analysis and testing.

Factory methods present a difficult challenge for static analysis techniques that model run-time objects based on their allocation sites. For a model built using static analysis techniques to be finite, run-time objects allocated during program execution must be represented by a finite set of abstract elements, which is typically based on object allocation sites, where all objects allocated at the same site are modeled as a single partition in the abstract program heap. Thus, where a factory method has multiple invocations, where each invocation represents a different control flow path that results in a different instance of the same class, the different instances would nevertheless be modeled as a single abstract object.

BRIEF SUMMARY

According to one embodiment of the present invention, a method, system, computer program product, and/or apparatus for performing static analysis of a computer software application. The embodiment can apply a first level of abstraction to model a plurality of run-time objects of a computer software application, thereby producing a set of object abstractions of the run-time objects. Static data-flow analysis of the computer software application can be performed using the set of object abstractions, thereby producing a first data-flow propagation graph, identifying a data-flow bottleneck within the data-flow propagation graph. A second level of abstraction can be applied to model any of the run-time objects having in the set of object abstractions a corresponding object abstraction that is traceable to the data-flow bottleneck. Applying the second level of abstraction can decompose the corresponding object abstraction into a plurality of object abstractions, thereby modifying the set of object abstractions. Static data-flow analysis of the computer software application can be performed using the modified set of object abstractions.

BRIEF DESCRIPTION OF THE SEVERAL VIEWS OF THE DRAWINGS

FIG. 3 is an embodiment of code illustrating aspects of the disclosure; and

DETAILED DESCRIPTION

Figure 1:
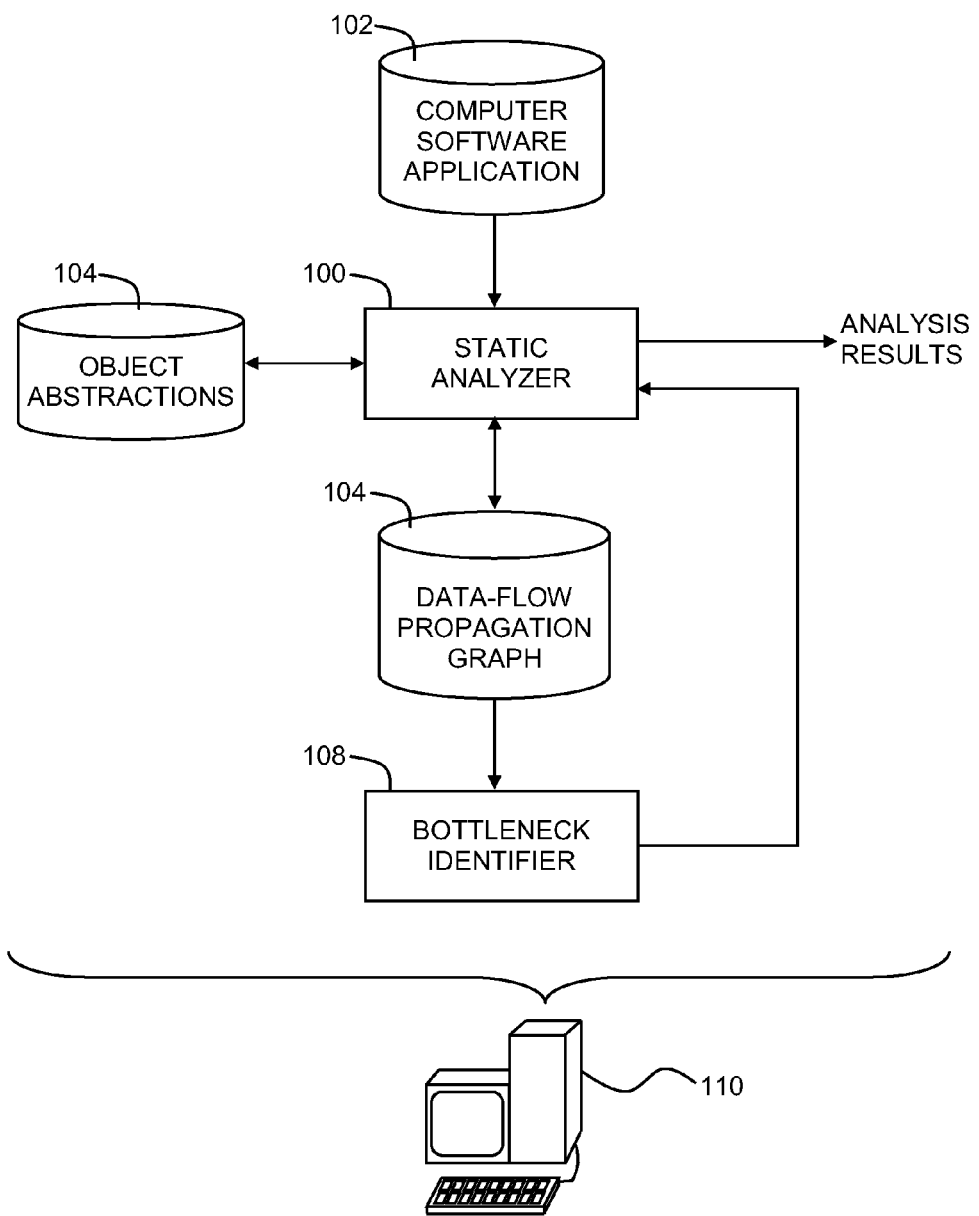
FIG. 1 is a simplified conceptual illustration of a static analysis system with automatic identification and modeling of factory methods, constructed and operative in accordance with an embodiment of the disclosure.

The term "static analysis" as it relates to computer software typically refers to analysis of the instructions of a computer software application that does not rely on the run-time execution of the application. In one type of static analysis, known as data-flow analysis, a graph is determined of a computer software application's control flows, and information is gathered about the possible values of variables at various points within the application, where the graph is used to determine those parts of the application to which data assigned to a particular variable might flow.

Factory methods are often used in object-oriented programming languages, such as Java™, for creating instances of a particular class or type sub-hierarchy in a controlled manner, without being exposed to concerns entailed by their direct construction were their constructors called explicitly.

As mentioned in the background, using a conventional technique, a factory method has multiple invocations, where each invocation represents a different control flow path that results in a different instance of the same class. Unfortunately, use of this conventional technique may lead to incorrect static analysis results. For example, if when performing static security analysis a factory method is encountered that has two invocations, where the first invocation uses an untrusted argument (e.g., the value of an HTTP parameter provided by an external user), whereas the second invocation does not, and where a field of the first instance is tainted and the same field of the second instance is used in a security-sensitive operation, since the different instances are modeled as a single abstract object, the path from the second invocation to the security-sensitive operation would be identified as representing a security vulnerability, when in fact it does not.

The above problems identified during the course of the disclosure have been resolved by details expressed herein. Specifically, in a one embodiment of the disclosure, static analysis of a computer software application can be performed by applying a first level of abstraction to model a plurality of run-time objects of a computer software application, thereby producing a set of object abstractions of the run-time objects. Static data-flow analysis of the computer software application can be performed using the set of object abstractions, thereby producing a first data-flow propagation graph. A data-flow bottleneck can be identified within the data-flow propagation graph. A second level of abstraction can be applied to model any of the run-time objects having in the set of object abstractions a corresponding object abstraction that is traceable to the data-flow bottleneck. The applying the second level of abstraction can decompose the corresponding object abstraction into a set of object abstractions, thereby modifying the set of object abstractions. Static data-flow analysis of the computer software application can be performed using the modified set of object abstractions.

The disclosure is now described within the context of one or more embodiments, although the description is intended to be illustrative of embodiments of the invention as a whole, and is not to be construed as limiting other embodiments of the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a conceptual illustration of a static analysis system with automatic identification and modeling of factory methods, constructed and operative in accordance with an embodiment of the disclosure. In the system of FIG. 1, a static analyzer 100 is configured to statically analyze a computer software application 102, such as by analyzing the instructions within a code base of computer software application 102 where the instructions are in the form of source code or bytecode. Static analyzer 100 is preferably configured to apply a first level of abstraction to model run-time objects of computer software application 102 to produce a set of object abstractions 104. For example, the first level of abstraction may be such that run-time objects are modeled as abstract objects based on their allocation sites alone, where an allocation site is represented by a syntactic expression whose execution results in the creation of a new run-time object. Static analyzer 100 is preferably configured to perform static data-flow analysis of computer software application 102 using the set of object abstractions 104 to produce a data-flow propagation graph 106 whose nodes represent control locations within computer software application 102 and whose edges represent data flow across the control locations.

A bottleneck identifier 108 is preferably configured to identify data-flow bottlenecks at control locations within data-flow propagation graph 106 in accordance with predefined criteria. For example, a control location c in data-flow propagation graph 106 may represent an n-k data-flow bottleneck if its in-degree in data-flow propagation graph 106 exceeds a threshold n and its out-degree exceeds a threshold k, and where there is a labeled edge c1-->c2 with label (d1,d2) if data-flow fact d1 holds at c1, c2 is reachable from c1 via a single control transition, and d2 holds at c2 as a consequence of d1 holding at c1.

Static analyzer 100 is preferably configured to trace data-flow bottlenecks identified within data-flow propagation graph 106 to specific abstractions of run-time objects, whereupon the abstractions may be refined in order to eliminate the data-flow bottlenecks. Static analyzer 100 may be further configured to determine whether a data-flow bottleneck is traceable to abstractions of run-time objects created or returned by a factory method in accordance with predefined criteria, such as by determining whether the data-flow bottleneck is due to an allocation statement within a method, where a value defined by the allocation statement is returned by the method. Static analyzer 100 is thus preferably configured to apply a second level of abstraction to model run-time objects whose abstractions are traceable to identified data-flow bottlenecks, and preferably only where the run-time objects are also identified as created or returned by factory methods. For example, if the first level of abstraction modeled run-time objects as abstract objects based on their allocation sites, the second level of abstraction may be such that run-time objects whose abstractions are traceable to identified data-flow bottlenecks are modeled as abstract objects based on their allocation sites as well as on call sites that call the methods encompassing their allocation sites. Thus, where a run-time object whose abstraction is traceable to a data-flow bottleneck has a corresponding object abstraction in the set of object abstractions 104 prior to applying the second level of abstraction, applying the second level of abstraction to model the run-time object whose abstraction is traceable to the data-flow bottleneck may decompose the corresponding object abstraction into two or more object abstractions, thus modifying the set of object abstractions 104.

Static analyzer 100 preferably performs static data-flow analysis of computer software application 102 using the modified set of object abstractions 104 to produce a modified version of data-flow propagation graph 106, or a new version which replaces data-flow propagation graph 106.

The set of object abstractions 104 and data-flow propagation graph 106 may be iteratively refined as described above, where data-flow bottlenecks are identified in each new or modified version of data-flow propagation graph 106, and where a further level of abstraction is selectively applied to model run-time objects whose abstractions are traceable to identified data-flow bottlenecks, such as based on an increasing number of call sites in a call path preceding a call to the method encompassing an allocation site. This iterative refinement preferably continues until a predefined termination condition is met, such as when a predefined number of iterations is reached, or when no additional data-flow bottlenecks are identified in a data-flow propagation graph, or when a predefined number of successive versions of a data-flow propagation graph are identical.

Static analyzer 100 is preferably configured to operate as described above prior to, or otherwise in support of, performing any type of static analysis in accordance with conventional techniques, such as security analysis, type state verification analysis, or constant propagation analysis.

Any of the elements shown in FIG. 1 are preferably executed by or otherwise made accessible to a computer 110, such as by implementing any of the elements in computer hardware and/or in computer software embodied in a physically-tangible, computer-readable medium in accordance with conventional techniques.

Figure 2:
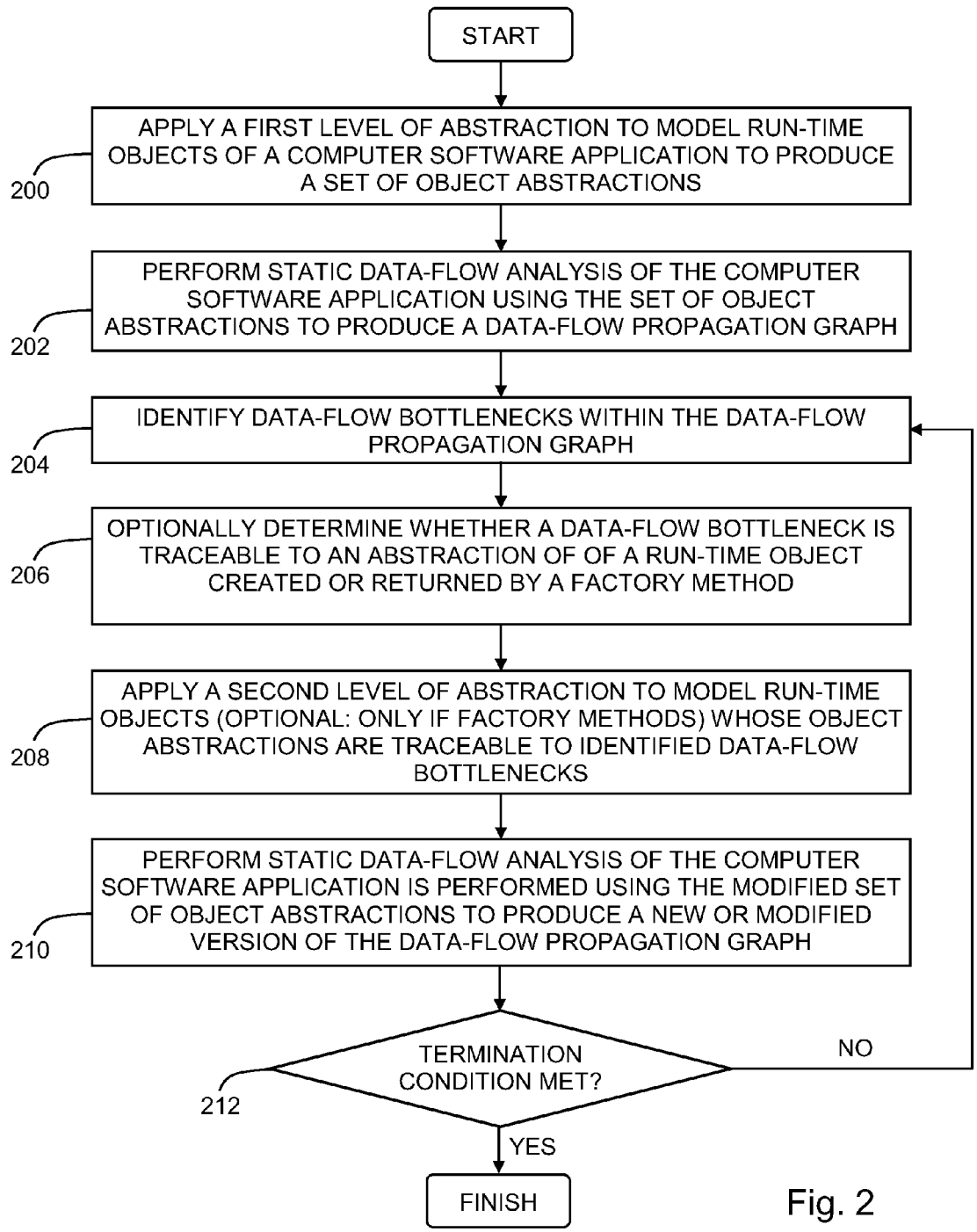
FIG. 2 is a simplified flowchart illustration of a method of operation of the system, operative in accordance with an embodiment of the disclosure.

Reference is now made to FIG. 2 which is a flowchart illustration of an exemplary method of operation of a system (such as the system of FIG. 1), operative in accordance with an embodiment of the disclosure. In the method of FIG. 2, apply a first level of abstraction is applied to model run-time objects of a computer software application to produce a set of object abstractions (step 200). Static data-flow analysis of the computer software application is performed using the set of object abstractions to produce a data-flow propagation graph of control locations and data flows within the computer software application (step 202). Data-flow bottlenecks are identified within the data-flow propagation graph (step 204). Optionally, it is determined whether a data-flow bottleneck is traceable to an abstraction of run-time objects created or returned by a factory method (step 206). A second level of abstraction is applied to model run-time objects whose abstractions are traceable to identified data-flow bottlenecks, and preferably only where the run-time objects are also identified as created or returned by factory methods (step 208). Static data-flow analysis of the computer software application is performed using the modified set of object abstractions to produce a modified version of the data-flow propagation graph or a new version which replaces the data-flow propagation graph (step 210). Steps 204-210 may be repeated where a further level of abstraction is applied during each iteration until a predefined termination condition is met (step 212).

Application of the system of FIG. 1 and method of FIG. 2 may be illustrated by way of example with reference to FIG. 3 in which exemplary code of a computer software application is shown in accordance with an embodiment of the disclosure. In FIG. 3 there are two invocations of the factory method UserProfiles.makeProfile. The first invocation uses an untrusted argument (e.g., the value of an HTTP parameter provided by an external user), whereas the second invocation does not. The userId field of the first instance is tainted by the assignment of userNameStr to it, and the userId field of the second instance is used in a security-sensitive operation. Where a single level of abstraction is used to model run-time objects based on their allocation sites, both instances of class UserProfile would be modeled as the same abstract object, such as where the name assigned to the abstract object is the bytecode location corresponding to the statement "return new UserProfile(userId)". Performing static security analysis using a data-flow propagation graph where this level of abstraction is used would thus result in a false-positive report of a security vulnerability, since the static analysis conservatively views the two instances as being one and the same abstract object, resulting a spurious vulnerable flow from the call to HttpServletRequest.getParameter to the call to DB.update.

To avoid this, the system of FIG. 1 and method of FIG. 2 may be employed, where instead of modeling the factory method as a single abstract object that results in a data-flow bottleneck in a data-flow propagation graph, a further level of abstraction is applied when modeling the factory method, such as by considering the allocation site in conjunction with the site of a call to the method encompassing the allocation site. Thus, the name assigned to an abstract object may be arrived at by prepending the bytecode location corresponding to the caller site to that of the method encompassing the allocation site, thus creating the following distinct abstract objects corresponding to the same allocation site:

UserProfiles.makeProfile(str)+return new UserProfile(userId), and
UserProfiles.makeProfile(admin)+return new UserProfile(userId).

Performing static security analysis using a data-flow propagation graph where this additional level of abstraction is applied would avoid the false-positive report of a security vulnerability.

Figure 4:
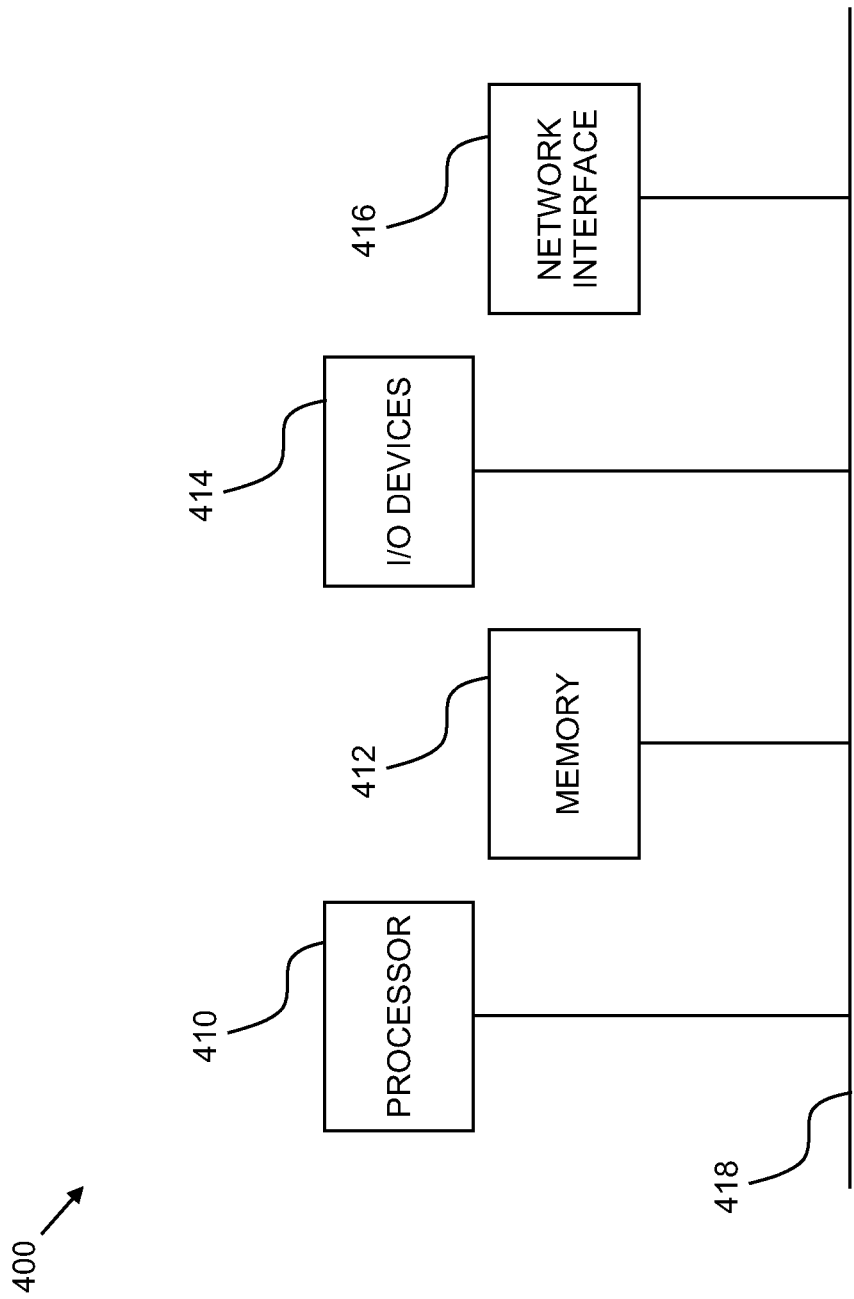
FIG. 4 is a block diagram illustration of a hardware implementation of a computing system, constructed and operative in accordance with an embodiment of the disclosure.

Referring now to FIG. 4, block diagram 400 illustrates a hardware implementation of a computing system in accordance with which one or more components/methodologies of the disclosure (e.g., components/methodologies described in the context of FIGS. 1 and/or 2) may be implemented, according to an embodiment of the disclosure.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the FIGS. 1-4 illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The invention claimed is:

1. A system comprising:
   a processor;
   a non-transitory computer-readable storage medium;
   a bus connecting the processor, and the non-transitory computer-readable medium to each other, wherein the non-transitory computer-readable medium comprises computer usable program code execute-able by said processor, the computer usable program code comprising:
   a bottleneck identifier configured to identify a data-flow bottleneck at control locations within a first data-flow propagation graph; and
   a static analyzer configured to:
   apply a first level of abstraction to model a plurality of run-time objects of a computer software application, thereby producing a set of object abstractions, and
   perform static data-flow analysis of the computer software application using the set of object abstractions, thereby producing the first data-flow propagation graph;
   apply a second level of abstraction to model any of the said run-time objects, which are identified as created or returned by factory methods and having in the set of object abstractions a corresponding object abstraction that is traceable to the data-flow bottleneck, based on corresponding allocation sites and call sites that call factory methods encompassing the corresponding allocation sites, where applying the second level of abstraction decomposes the corresponding object abstraction into a plurality of object abstractions, thereby modifying the set of object abstractions, and
   perform static data-flow analysis of the computer software application using the modified set of object abstractions,
   wherein the static analyzer is configured to perform static data-flow analysis of the computer software application using the modified set of object abstractions to modify the data-flow propagation graph, and where the static analyzer and bottleneck identifier are configured to iteratively apply the levels of abstraction, perform the static analyses, and identify data-flow bottlenecks within the data-flow propagation graph until a termination condition is met.

2. The system of claim 1 where the bottleneck identifier is configured to identify the data-flow bottleneck as being traceable to an object abstraction of a run-time object allocated by an allocation statement within the factory method, where a value defined by the allocation statement is returned by the factory method.

3. The system of claim 1 where the termination condition is met when a predefined number of iterations greater than two are reached.

4. The system of claim 1 where the termination condition is met when no additional data-flow bottlenecks are identified in the data-flow propagation graph.

5. The system of claim 1 where the termination condition is met when two successive versions of the data-flow propagation graph are identical.

6. The system of claim 1 where the static analyzer is configured to perform static data-flow analysis of the computer software application using the modified set of object abstractions to replace the data-flow propagation graph with a new data-flow propagation graph, and where the static analyzer and bottleneck identifier are configured to iteratively apply the levels of abstraction, perform the static analyses, and identify data-flow bottlenecks within the data-flow propagation graph until a termination condition is met.

7. The system of claim 6 where the termination condition is met when a predefined number of iterations greater than two are reached.

8. The system of claim 6 where the termination condition is met when no additional data-flow bottlenecks are identified in the data-flow propagation graph.

9. The system of claim 6 where the termination condition is met when two successive versions of the data-flow propagation graph are identical.

10. The system of claim 6 wherein the static analyzer is configured to perform static data-flow analysis of the computer software application using the modified set of object abstractions to at least one of:
   modify the data-flow propagation graph, and
   replace the data-flow propagation graph with a new data-flow propagation graph.

11. A computer program product comprising:
   a non-transitory computer-readable storage medium; and
   computer-readable program code embodied in the computer-readable storage medium, where the computer-readable program code is configured to:
   apply a first level of abstraction to model a plurality of run-time objects of a computer software application, thereby producing a set of object abstractions;
      perform static data-flow analysis of the computer software application using the set of object abstractions, thereby producing a first data-flow propagation graph;
      identify a data-flow bottleneck within the data-flow propagation graph;
      apply a second level of abstraction to model any of the said run-time objects, which are identified as created or returned by factory methods and having in the set of object abstractions a corresponding object abstraction that is traceable to the data-flow bottleneck, based on corresponding allocation sites and call sites that call factory methods encompassing the corresponding allocation sites, where applying the second level of abstraction decomposes the corresponding object abstraction into a plurality of object abstractions, thereby modifying the set of object abstractions; and
      perform static data-flow analysis of the computer software application using the modified set of object abstractions,
   wherein the computer-readable program code is configured to perform static data-flow analysis of the computer software application using the modified set of object abstractions to at least one of:
   modify the data-flow propagation graph, and
   replace the data-flow propagation graph with a new data-flow propagation graph, and
   iteratively apply the levels of abstraction, perform the static analyses, and identify data-flow bottlenecks within the data-flow propagation graph until a termination condition is met.

12. A computer system comprising:
   one or more processors, one or more computer-readable memories and one or more computer-readable, tangible storage devices;
   program instructions, stored on at least one of the one or more storage devices for execution by at least one of the one or more processors via at least one of the one or more memories, to apply a first level of abstraction to model a plurality of run-time objects of a computer software application to produce a set of object abstractions of the run-time objects;
   program instructions, stored on at least one of the one or more storage devices for execution by at least one of the one or more processors via at least one of the one or more memories, to produce a first data-flow propagation graph using the set of object abstractions;
   program instructions, stored on at least one of the one or more storage devices for execution by at least one of the one or more processors via at least one of the one or more memories, to identify a data-flow bottleneck within the first data-flow propagation graph;
   program instructions, stored on at least one of the one or more storage devices for execution by at least one of the one or more processors via at least one of the one or more memories, to apply a second level of abstraction to model any of the said run-time objects which are identified as created or returned by factory methods and having in the set of object abstractions a corresponding object abstraction that is traceable to the data-flow bottleneck, based on corresponding allocation sites and call sites that call factory methods encompassing the corresponding allocation sites, where applying the second level of abstraction decomposes the corresponding object abstraction into a plurality of object abstractions, thereby producing a modified the set of object abstractions;
   program instructions, stored on at least one of the one or more storage devices for execution by at least one of the one or more processors via at least one of the one or more memories, to perform static data-flow analysis of the computer software application using the modified set of object abstractions; and
   program instructions of a static analyzer, stored on at least one of the one or more storage devices for execution by at least one of the one or more processors via at least one of the one or more memories, to perform static data-flow analysis of the computer software application using the modified set of object abstractions to modify the data-flow propagation graph, and where the static analyzer and bottleneck identifier are configured to iteratively apply the levels of abstraction, perform the static analyses, and identify data-flow bottlenecks within the data-flow propagation graph until a termination condition is met.

13. The system of claim 1 where the static analyzer is configured to perform static data-flow analysis of the computer software application using the set of object abstractions, thereby producing the first data-flow propagation graph whose nodes represent control locations within the computer software application and whose edges represent data flow across the control locations.

14. The system of claim 13 where the static analyzer is further configured to identify one or more object abstractions associated with the run-time objects that are traceable to the data-flow bottleneck.

15. The computer program product of claim 11 where the termination condition is met when a predefined number of iterations greater than two are reached.

16. The computer program product of claim 11 where the termination condition is met when no additional data-flow bottlenecks are identified in the data-flow propagation graph.

17. The computer program product of claim 11 where the termination condition is met when two successive versions of the data-flow propagation graph are identical.

18. The computer program product of claim 11 where the computer-readable program code is configured to identify the data-flow bottleneck at control locations within a data-flow propagation graph.

* * * * *